(12) United States Patent
Tanimori et al.

(10) Patent No.: US 11,336,841 B2
(45) Date of Patent: May 17, 2022

(54) CONTROLLER AND INFORMATION PROCESSING SYSTEM FOR VEHICLE

(71) Applicant: TOYOTA JIDOSHA KABUSHIKI KAISHA, Toyota (JP)

(72) Inventors: Shunsuke Tanimori, Susono (JP); Yoshihiro Ohe, Kawasaki (JP); Ayana Takeshita, Kasugai (JP); Ryosuke Tanimura, Nisshin (JP); Yuhei Suzuki, Kariya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/727,102

(22) Filed: Dec. 26, 2019

(65) Prior Publication Data

US 2020/0252557 A1    Aug. 6, 2020

(30) Foreign Application Priority Data

Feb. 1, 2019    (JP) .............................. JP2019-017384

(51) Int. Cl.
*G06F 16/29*    (2019.01)
*H04N 5/28*    (2006.01)
*H04W 4/90*    (2018.01)
*H04W 4/44*    (2018.01)
*B60S 1/04*    (2006.01)
*H04N 5/232*    (2006.01)
(Continued)

(52) U.S. Cl.
CPC .............. *H04N 5/28* (2013.01); *B60R 11/04* (2013.01); *B60S 1/0452* (2013.01); *G06V 20/41* (2022.01); *G06V 20/56* (2022.01); *H04N 5/23203* (2013.01); *H04W 4/44* (2018.02); *H04W 4/90* (2018.02)

(58) Field of Classification Search
CPC ....... H04N 5/28; H04N 5/23203; H04W 4/44; H04W 4/90; G06K 9/00791; G06K 9/00718; B60S 1/0452; B60R 11/04
See application file for complete search history.

(56) References Cited

U.S. PATENT DOCUMENTS 4,671,235 A * 6/1987 Hosaka ................ B60K 31/107
                                                                    123/352
4,962,570 A * 10/1990 Hosaka ................. F02D 11/105
                                                                    180/197
(Continued)

FOREIGN PATENT DOCUMENTS

JP    2016-149075 A    8/2016
JP    2017-103509 A    6/2017

*Primary Examiner* — Philip P. Dang
(74) *Attorney, Agent, or Firm* — Oblon, McClelland, Maier & Neustadt, L.L.P.

(57) ABSTRACT

A controller for a vehicle includes: a disaster determining section that determines presence or absence of damage caused by a disaster; and an activating section that activates a capturing section mounted on the vehicle. An information processing system is an information processing system that includes plural vehicles and a server. The vehicle activates the capturing section mounted on the vehicle at the time of the disaster, and sends a video image captured by the capturing section and location information to the server. The server accumulates the video images sent from the plural vehicles, and associates the video images with map information.

10 Claims, 4 Drawing Sheets

(51) Int. Cl.
  *B60R 11/04* (2006.01)
  *G06V 20/40* (2022.01)
  *G06V 20/56* (2022.01)

(56) References Cited

U.S. PATENT DOCUMENTS

| | | | | |
|---|---|---|---|---|
| 5,458,690 A * | 10/1995 | Longazel | | B60S 1/0486 15/250.19 |
| 5,886,321 A * | 3/1999 | Pinchok, Jr. | | B60S 1/048 219/203 |
| 5,986,350 A * | 11/1999 | Hirano | | B60R 16/03 370/453 |
| 6,415,210 B2 * | 7/2002 | Hozuka | | G07C 5/008 340/439 |
| 6,587,573 B1 * | 7/2003 | Stam | | B60Q 1/085 382/104 |
| RE38,338 E * | 12/2003 | Yoshida | | G07C 9/00182 340/426.36 |
| 7,342,373 B2 * | 3/2008 | Newman | | B60H 1/00735 318/471 |
| 7,533,718 B2 * | 5/2009 | Straub | | B60S 1/0818 236/51 |
| 7,653,215 B2 * | 1/2010 | Stam | | G06V 20/56 382/104 |
| 8,063,944 B2 * | 11/2011 | Kido | | H04N 5/3532 348/222.1 |
| 8,120,652 B2 * | 2/2012 | Bechtel | | H04N 5/3454 348/148 |
| 8,290,649 B2 * | 10/2012 | Iwashita | | B60L 53/65 701/22 |
| 8,392,050 B2 * | 3/2013 | Arai | | B60R 16/033 340/636.15 |
| 9,241,363 B2 * | 1/2016 | Matsushita | | H04W 76/15 |
| 9,531,783 B2 * | 12/2016 | Ueoka | | H04N 7/18 |
| 9,630,629 B2 * | 4/2017 | Kim | | G01J 5/0025 |
| 9,679,487 B1 * | 6/2017 | Hayward | | G08G 7/02 |
| 9,686,124 B2 * | 6/2017 | Ameixiera | | H04W 48/12 |
| 9,905,133 B1 * | 2/2018 | Kumar | | G08G 1/205 |
| 10,143,040 B2 * | 11/2018 | Condeixa | | H04W 88/04 |
| 10,147,247 B2 * | 12/2018 | Nishida | | G07C 5/008 |
| 10,163,164 B1 * | 12/2018 | Tofte | | G06T 7/00 |
| 10,370,102 B2 * | 8/2019 | Boykin | | H04N 5/23206 |
| 10,576,916 B2 * | 3/2020 | Takamatsu | | H04L 12/42 |
| 10,780,847 B2 * | 9/2020 | Takamatsu | | B60R 16/0238 |
| 2005/0134710 A1 * | 6/2005 | Nomura | | H04N 5/23245 348/E5.025 |
| 2013/0107054 A1 * | 5/2013 | Ueoka | | G08G 1/127 348/148 |
| 2015/0009331 A1 * | 1/2015 | Venkatraman | | B61L 27/53 348/148 |
| 2016/0031419 A1 * | 2/2016 | Nelson | | B60S 1/482 451/41 |
| 2019/0077401 A1 * | 3/2019 | Katagiri | | B60W 10/20 |
| 2019/0359154 A1 * | 11/2019 | Kim | | B60R 16/033 |

* cited by examiner

CONTROLLER AND INFORMATION PROCESSING SYSTEM FOR VEHICLE

INCORPORATION BY REFERENCE

The disclosure of Japanese Patent Application No. 2019-017384 filed on Feb. 1, 2019 including the specification, drawings and abstract is incorporated herein by reference in its entirety.

BACKGROUND

1. Technical Field

The disclosure relates to a controller and an information processing system for a vehicle and, in particular, to a controller and an information processing system for a vehicle that acquire disaster information at the time of a disaster.

2. Description of Related Art

At the time of a disaster, it is essential to immediately grasp a disaster-affected situation for a prompt rescue and the like. For example, it is disclosed in Japanese Patent Application Publication No. 2016-149075 (JP 2016-149075 A) to acquire disaster information that is posted on a disaster information posting site and includes an image of a disaster-affected location captured by a cellular phone with a Global Positioning System (GPS) and a camera and a captured location, effectively use this acquired disaster information to immediately estimate the disaster-affected location, and thereby create a hazard map.

In addition, it is disclosed in JP 2017-103509 A to use a head-mounted display that is attached to a user's head and has a capturing section for capturing an image around the user and to confirm a peripheral disaster-affected situation and whether the user is affected by the disaster on the basis of the image captured by the capturing section at the time of the disaster.

SUMMARY

However, in the conventional means, the information can only be acquired when a person enters a disaster-affected area to capture a video image. Although it is considered to create the hazard map by using an image that is captured by an in-vehicle camera, the vehicle is usually abandoned in a power-off state in the area that is devastatingly affected by the disaster. Thus, the in-vehicle camera cannot be activated. As a result, it is difficult to acquire video image data of the area, which is devastatingly affected by the disaster and video image of which is essential.

A purpose of the disclosure that has been made in view of a problem as described above is to provide a controller and an information processing system for a vehicle capable of acquiring a video image of a disaster-affected area even when a person does not enter the dangerous disaster-affected area at the time of a disaster.

A controller for a vehicle according to an aspect of the disclosure includes: a disaster determining section that determines presence or absence of damage caused by a disaster; and an activating section that activates a capturing section mounted on the vehicle in the case where it is determined that the vehicle is affected by the disaster.

An information processing system according to another aspect of the disclosure is an information processing system that includes plural vehicles and a server. The vehicle activates a capturing section mounted on the vehicle at the time of a disaster, and sends a video image captured by the capturing section and location information to the server. The server accumulates the video images sent from the plural vehicles, and associates the video images with map information.

According to the controller and the information processing system for the vehicle in the disclosure, it is possible to acquire the video image of a disaster-affected area even when a person does not enter the dangerous disaster-affected area at the time of the disaster.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on an embodiment of the disclosure. A controller for a vehicle in the disclosure activates a capturing section (an in-vehicle camera), which is mounted on the vehicle, at the time of a disaster even when the vehicle is unattended, so as to be able to capture a video image of a disaster-affected area around the vehicle. In addition, an information processing system in the disclosure can grasp a disaster-affected situation on the basis of the real-time video image from the vehicle in the disaster-affected area.

EMBODIMENT

Figure 1:
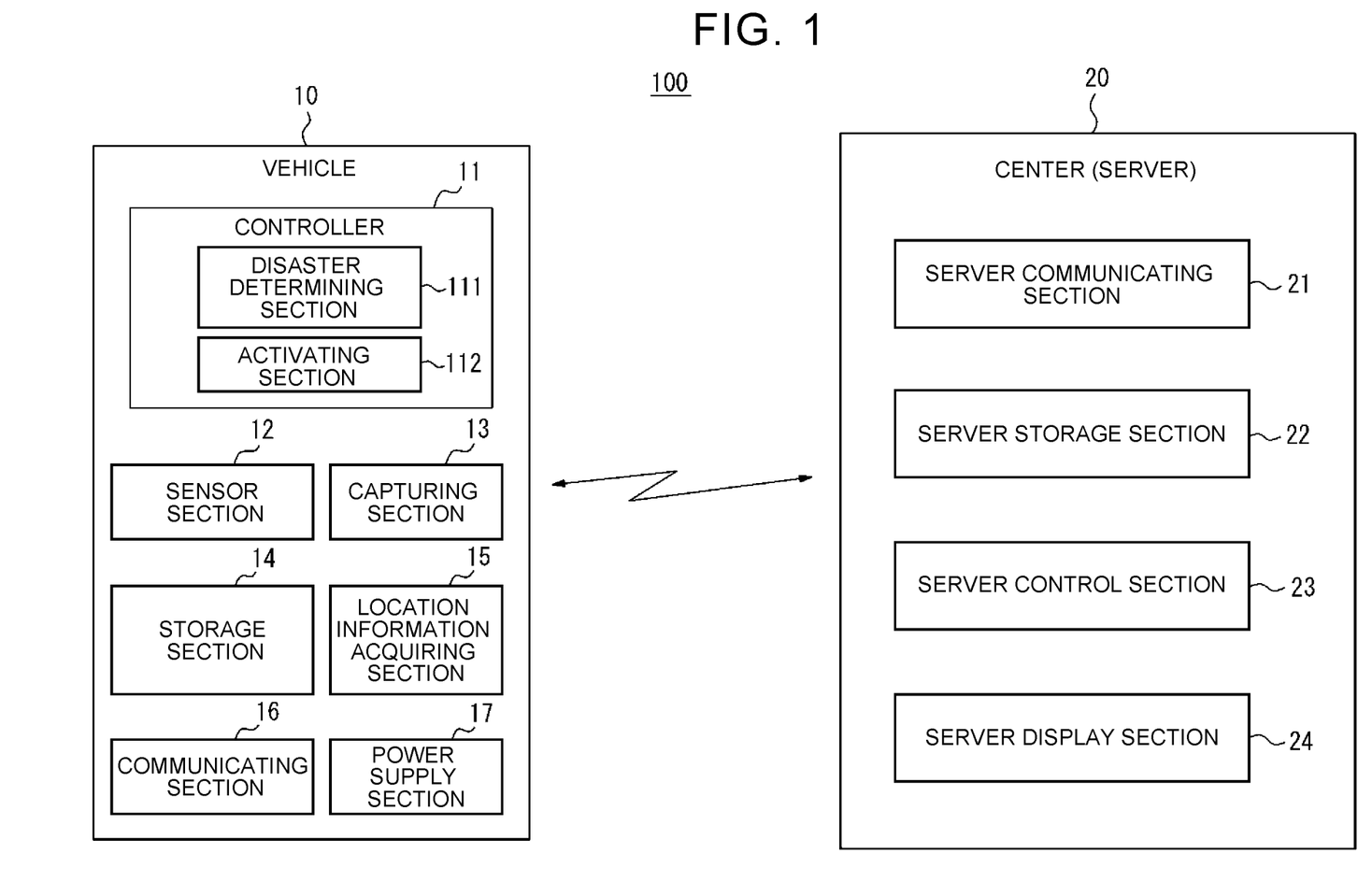
FIG. 1 is a diagram illustrating an example of an information processing system according to an embodiment of the disclosure.

FIG. 1 illustrates an example of an information processing system 100 for grasping a situation of a disaster-affected area according to an embodiment of the disclosure. The information processing system 100 includes a vehicle 10 and a center (server) 20. While FIG. 1 only illustrates the single vehicle 10 representatively, a large number of the vehicles 10 actually constitute the information processing system 100, and each of the vehicles 10 can communicate with the server 20. The vehicle 10 is not limited to a gasoline vehicle but may be an electric vehicle, a hybrid vehicle (HV), a fuel cell vehicle (FCV), or the like.

When determining that the vehicle 10 is affected by the disaster, the vehicle 10 activates a capturing section mounted on the vehicle to generate (capture) a video image around the vehicle, and then sends the generated video image to the center (server) 20 in real time.

The server 20 receives the video images from the large number of the vehicles 10, and creates a hazard map. In this way, the disaster-affected situation can accurately be grasped even when no one enters the disaster-affected area.

A detailed description will hereinafter be made. The vehicle 10 is assumed as an unattended vehicle in the disaster-affected area, and includes a controller 11, a sensor section 12, a capturing section 13, a storage section 14, a location information acquiring section 15, a communicating section 16, and a power supply section 17.

The controller 11 includes one or more processors. The "processor" may be a general-purpose processor or a dedicated processor specialized in particular processing. For example, an electronic control unit (ECU) that is mounted on the vehicle 10 may function as the controller 11. The controller 11 controls overall operation of the vehicle 10. For example, the controller 11 controls the sensor section 12, the capturing section 13, the storage section 14, the location information acquiring section 15, the communicating section 16, and the power supply section 17, and also executes overall control related to travel and the operation of the host vehicle. In this embodiment, the controller 11 of the vehicle 10 is always connected to a permanent power supply (a battery (BAT) power supply), for example. Thus, even when the vehicle 10 is in a stopped state (for example, an accessory (ACC)-off state and an ignition (IG)-off state), a minimum function of the controller 11 is activated. The controller 11 includes: a disaster determining section 111 that determines presence or absence of damage caused by the disaster; and an activating section 112 that activates the capturing section 13 and the like mounted on the vehicle 10.

The disaster determining section 111 determines the presence or the absence of the damage to the host vehicle 10 by the disaster on the basis of information from the sensor section 12 (for example, an immersion sensor, an earthquake sensor, or the like). Alternatively, the disaster determining section 111 may determine that the host vehicle 10 is in the disaster-affected situation when receiving emergency disaster information (for example, an emergency warning broadcast, hazard information, or the like) from the communicating section 16.

In the case where the disaster determining section 111 determines that the host vehicle 10 is affected by the disaster, the activating section 112 at least activates the capturing section 13 mounted on the vehicle 10. The activating section 112 may activate not only the capturing section 13 but also functional sections required to accurately transmit the disaster-affected situation, such as the storage section 14, the location information acquiring section 15, and the communicating section 16. In addition, the activating section 112 may switch a power state by bringing the power supply section 17 into a state capable of supplying power to each of the sections, and the like when necessary.

The sensor section 12 at least includes a sensor for detecting the presence or the absence of the damage caused by the disaster. For example, the sensor may be the immersion sensor that detects water immersion of the inside of the vehicle, the earthquake sensor that detects vibrations of an earthquake, or an inclination sensor that detects an abnormal inclination of a vehicle body. The sensor section 12 is connected to a permanent power supply (a BAT power supply), for example. Thus, even in the stopped state (the ACC-off and TG-off state) of the vehicle 10, the sensor section 12 is in an activated state. When detecting abnormality (the damage caused by the disaster) from these various sensors, the sensor section 12 outputs a detection result to the controller 11.

The capturing section 13 is a so-called in-vehicle camera, and includes a camera that captures an image in front of (on the outside of) the vehicle 10. The capturing section 13 is desirably a drive recorder that generates a continuous video image in front of the vehicle during the travel and a stop and records the generated video image in the storage section 14. The number of the camera in the capturing section 13 is not limited to one, and the capturing section 13 may also include a camera that captures an image on a side or at the rear of the vehicle 10. The capturing section 13 is activated by the activating section 112 of the controller 11, and generates (captures) the video image (the video image of the disaster-affected situation) around the vehicle 10.

The storage section 14 is a device that records and stores various types of information, and includes one or more units of memory. The "memory" may be semiconductor memory, magnetic memory, optical memory, or the like, for example. However, the "memory" is not limited thereto. Each of the memories provided in the storage section 14 may function as a main storage device, an auxiliary storage device, or cache memory, for example. The storage section 14 stores arbitrary information related to the operation of the vehicle 10. For example, in this embodiment, the storage section 14 stores the video image generated by the capturing section 13 and location information acquired by the location information acquiring section 15 in association with time information at the time of generation. The storage section 14 also accumulates various types of information on the operation and control of the vehicle 10, such as memory of a vehicle control program of the host vehicle.

The location information acquiring section 15 includes one or more receivers that correspond to an arbitrary satellite positioning system. For example, the location information acquiring section 15 may include a GPS receiver. The location information acquiring section 15 detects the location information of the host vehicle 10 (particularly, a video image captured location where the video image of the disaster-affected situation is captured).

The communicating section 16 includes a communication module that communicates between the host vehicle 10 and the server 20. The communicating section 16 may include a communication module that is connected to a network or a communication module that corresponds to a mobile communication standard such as 4th Generation (4G) or 5th Generation (5G). For example, an in-vehicle communicator, such as a data communication module (DCM), is mounted on the vehicle 10 may function as the communicating section 16. In this embodiment, the communicating section 16 sends the video image captured by the capturing section 13 and the vehicle location information to the server 20.

In order to implement each of the functions of the vehicle 10, the power supply section (a battery) 17 supplies the power (a current and a voltage) to each of the devices and each of the functional sections mounted on the vehicle 10. In addition, the power supply section 17 may include an auxiliary power supply section as a part thereof or an independent component from the power supply section 17. In this embodiment, the power supply section 17 supplies the power at least to the controller 11 and the sensor section 12 to allow minimum operation (for example, the disaster determination) thereof even during the stop of the vehicle 10. The power supply section 17 generally has an ACC-on state (a state of supplying the power to equipment connected to an ACC power supply) and an IG-on state (a state of supplying the power to the equipment connected to the ACC power supply and/or an IG power supply). In this embodiment, the power supply section 17 may have a special power supply state that only allows the operation of the minimum required functional sections (for example, the capturing section 13, the communicating section 16, and the like) to capture and send the video image.

Next, the center (server) 20 includes a server communicating section 21, a server storage section 22, and a server control section 23, and a server display section 24.

The server communicating section 21 includes a communication module that communicates between the server 20 and the vehicle 10. The server communicating section 21 may include a communication module that is connected to the network. The server communicating section 21 can receive the information (video image data of a current situation of the disaster-affected area and the like) sent from the vehicle 10. In addition, the server communicating section 21 can send (provide) the information on a determination result of the disaster-affected situation to the outside.

The server storage section 22 is a device that records and stores various types of information, and includes one or more units of memory. The "memory" may be the semiconductor memory, the magnetic memory, the optical memory, or the like, for example. However, the "memory" is not limited thereto. Each of the memories provided in the server storage section 22 may function as the main storage device, the auxiliary storage device, or the cache memory, for example. In this embodiment, the server storage section 22 accumulates the information sent from each of the vehicles 10 (the video image data of the disaster-affected area, video image captured time, information on the video image captured location (a vehicle location), and the like), for example. The server storage section 22 also stores information on results of an analysis and processing of the received information by the server control section 23. The server storage section 22 stores map information and can associate the map information with location (video image captured location) information received from the vehicle 10. The server storage section 22 further accumulates various types of information on the operation and the control of the server 20 and the entire information processing system 100.

The server control section 23 includes one or more processors. The "processor" may be the general-purpose processor or the dedicated processor specialized in particular processing. The server control section 23 controls the server communicating section 21, the server storage section 22, and the server display section 24, and also executes overall control related to the operation of the server 20 and the entire information processing system 100. In this embodiment, the server control section 23 functions as a determination section that analyzes the information sent from each of the vehicles 10 (the video image data of the disaster-affected area and the like) to determine a disaster-affected state. The server control section 23 can further execute processing to create the hazard map.

The server display section 24 can control one or more display devices and display the information sent from each of the vehicles 10 (the video image data of the disaster-affected area and the like). In addition, the server display section 24 may display the disaster-affected situation analyzed by the server control section 23. The server 20 may include the display device, or the server 20 may be connected to the external display device and control such a display device.

Next, a description will be made on the operation of the vehicle 10.

Figure 2:
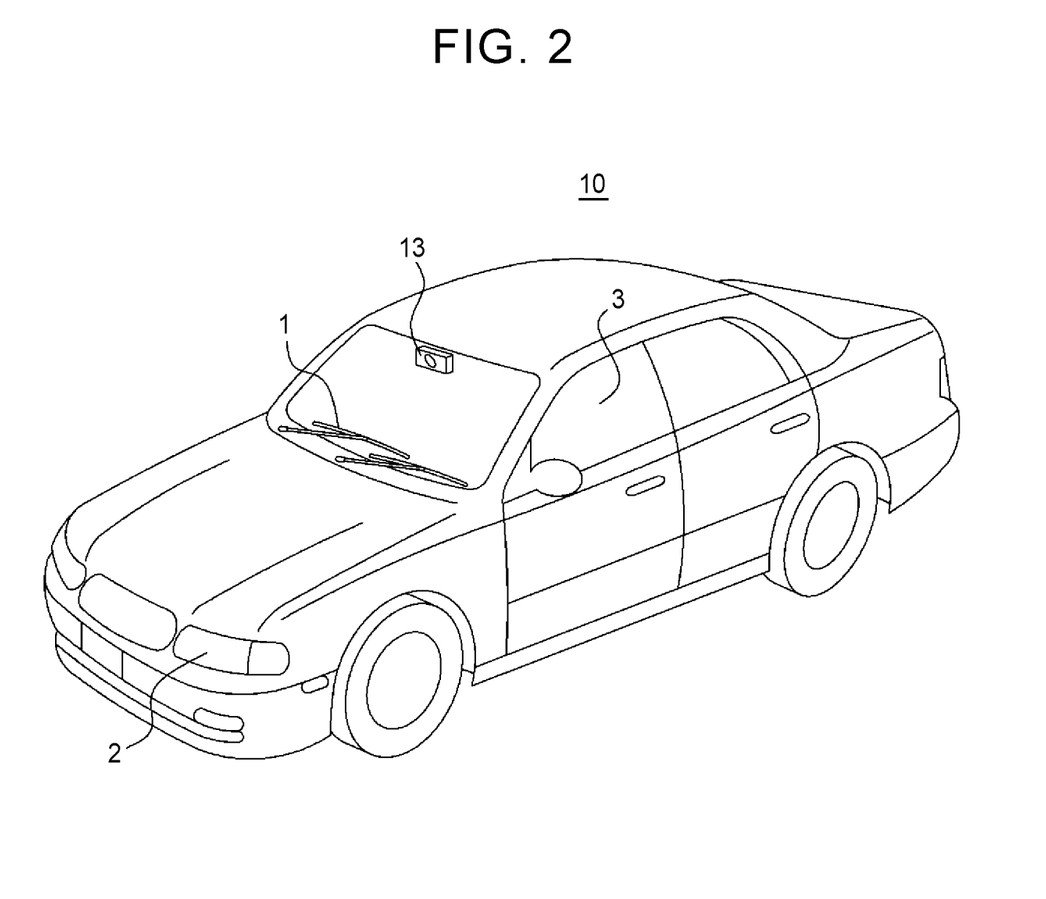
FIG. 2 is a conceptual view of an unattended vehicle in a disaster-affected place.
Figure 3:
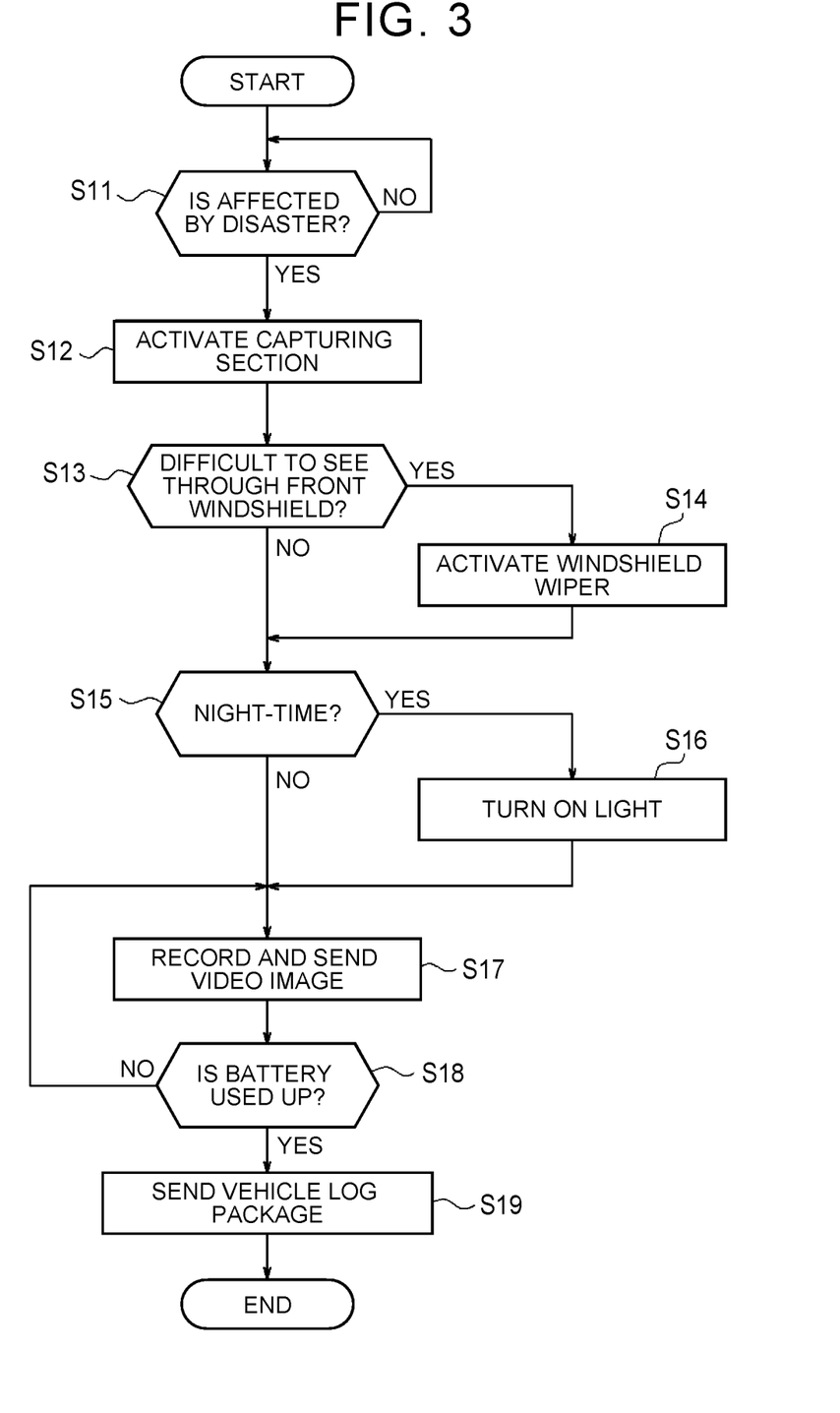
FIG. 3 is a flowchart for explaining processing of the vehicle according to the embodiment.

FIG. 2 is a conceptual view of the unattended vehicle 10 that is placed in a disaster-affected place. FIG. 3 is a flowchart for explaining the processing of the vehicle 10. A description will sequentially be made on the processing of the vehicle 10 with reference to the flowchart.

Step 11 (S11): The vehicle 10 (the controller 11) determines whether the host vehicle is affected by the disaster. More specifically, the inclination sensor, and the like) 12, the disaster determining section 111 of the controller 11 determines the presence or the absence of the damage caused by the disaster on the basis of an output signal from the sensor section (the immersion sensor, the earthquake sensor. Alternatively, based on a signal from the communicating section 16 indicating that the emergency warning broadcast (the emergency disaster information) is received, the disaster determining section 111 determines that the host vehicle is in the disaster-affected situation. If it is determined that the host vehicle is affected by the disaster, the processing proceeds to step 12. If it is not determined that the host vehicle is affected by the disaster, the processing returns to START.

Step 12 (S12): When detecting the damage caused by the disaster, in the vehicle 10, the activating section 112 activates the capturing section 13 (see FIG. 2) to generate the video image in front of (or around) the vehicle 10. The activating section 112 also activates the storage section 14, the location information acquiring section 15, and the communicating section 16 when necessary.

Step 13 (S13): The vehicle 10 analyzes the video image acquired by the capturing section 13, and determines whether rain or snow falls on a front windshield and brings the front windshield into a state through which it is difficult to see the outside from a cabin. If the front windshield is in the state through which it is difficult to see the outside, the processing proceeds to step S14. If the front windshield is not in the state through which it is difficult to see the outside, the processing proceeds to step S15.

Step 14 (S14): If determining that the front windshield is in the state through which it is difficult to see the outside (the state where rain or snow falls on the front windshield), the vehicle 10 activates a windshield wiper 1 (FIG. 2). By activating the windshield wiper 1, rain or water is removed from the front windshield, and thus the clear video image can be acquired.

In the case where the windshield wiper 1 does not move even when being activated, a case where the vehicle 10 is buried in dirt and thus the outside cannot be seen is assumed. Accordingly, in such a case, it is desired to send information that the windshield wiper 1 does not move with the image captured by the capturing section 13.

Step 15 (S15): The vehicle 10 analyzes the video image acquired by the capturing section 13, and determines whether it is in a state where it is dark and thus difficult to see the outside in the night-time. If it is in the state where it is difficult to see, the processing proceeds to step S16. If it is in a state where it is bright outside, the processing proceeds to step S17.

Step 16 (S16): If determining that it is dark outside in the night-time and it is in the state where it is difficult to see, the vehicle 10 turns on a light 2 (FIG. 2). When the light 2 is turned on, the bright video image can be captured even in the night-time.

Step 17 (S17): The vehicle 10 records and sends the video image captured by the capturing section 13. Recording of the video image is not essential work. However, in the case where the video image is recorded, the video image can be retrieved from the storage section 14 and can be used at a later date even when a trouble or the like occurs in sending of the video image data. Thus, the video image is desirably recorded in the storage section 14.

The vehicle 10 sends the video image captured by the capturing section 13 to the server 20 by using the communicating section 16. In the case where the capturing section 13 itself has a communicating function, the communicating function of the capturing section 13 may be used to send the video image. When the video image is sent, in addition to the captured video image, at least a captured location (the location information of the vehicle 10) is simultaneously sent. Furthermore, captured time is desired to be sent. It is preferred that the capturing section 13 continuously captures the video image and the communicating section 16 continuously sends the video image as long as a charged amount of the power supply section (the battery) 17 is sufficient. However, in order to suppress consumption of the charged amount of the power supply section 17, the capturing section 13 may capture the video image intermittently, and the communicating section 16 may send the video image intermittently.

Step 18 (S18): The vehicle 10 determines whether the power supply section (the battery) 17 is used up. If the power supply section 17 is not used up and the charged amount is sufficient, the processing returns to step 17, and capturing and sending of the video image continue. If the power supply section (the battery) 17 is used up and the charged amount is reduced to a specified amount, the processing proceeds to step 19.

Step 19 (S19): When the charged amount of the power supply section 17 reaches the specified amount, the vehicle 10 stops capturing and sending the video image, and sends a vehicle log package at the time point. Here, the specified amount is the charged amount of the power in such a degree that an engine is restarted with no problem. In post-processing in the disaster-affected place, the vehicle 10 has to be moved. Thus, before being completely used, the charged amount of the power supply section (the battery) 17 is left to such a degree that the vehicle can be started, and the operation to provide the disaster information (capturing and sending of the video image) is terminated. Then, the vehicle 10 sends the vehicle log (all the information on the vehicle state such as information on a damaged state, various types of the sensor information, and the location information) as the package to the server 20, and the processing is terminated.

The above log package is recorded in the server 20, which is effective when a present location of the vehicle 10 and the like are checked, when the processing is determined on the basis of the state of the vehicle 10, and the like in the post-processing in the disaster-affected place.

In the case where no one is in the vehicle 10 and a window of the vehicle 10 is opened at the time when the damage caused by the disaster is determined (for example, at the time of the water immersion or at the time of fire), the power is desirably supplied to a power window, so as to perform an operation to close a window glass 3 (FIG. 2). In this way, the water immersion of the inside of the vehicle and the like are prevented. Thus, it is possible to protect the capturing section (the in-vehicle camera) 13 and capture the video image for a long period.

Figure 4:
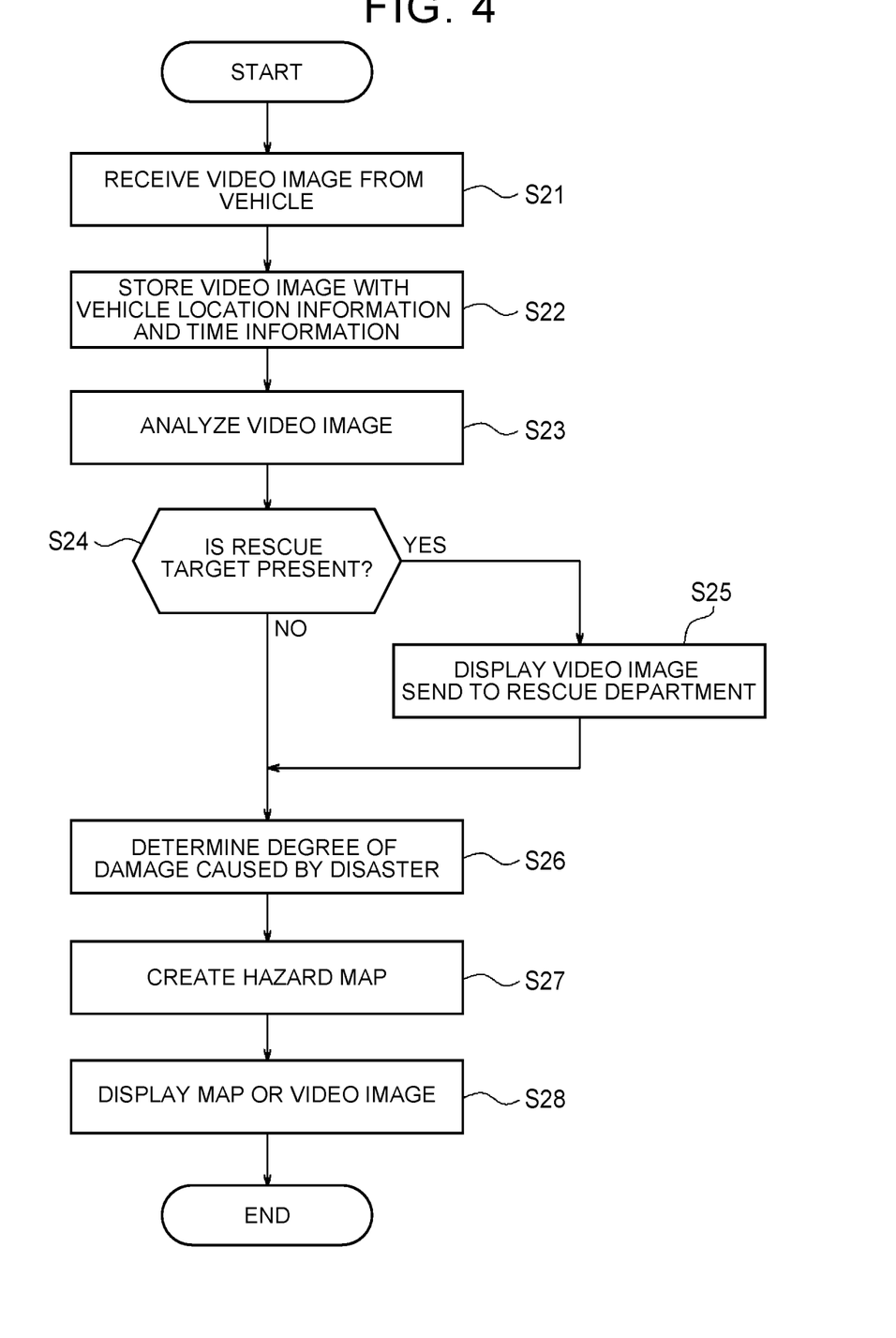
FIG. 4 is a flowchart for explaining processing of a server according to the embodiment.

Next, a description will be made on the operation of the server 20. FIG. 4 is a flowchart for explaining the processing of the server 20. A description will sequentially be made on the processing of the server 20 with reference to the flowchart.

Step 21 (S21): First, the server 20 receives the video image (the video image data), which is sent from the vehicle 10, by the server communicating section 21. The server 20 also receives the vehicle location information at the time of capturing the video image.

Step 22 (S22): The server 20 records the received video image with the vehicle location information and time information in the server storage section (a database) 22. The time information can be added on the server 20 side on the basis of received time. However, the further accurate time information can be acquired by adding and sending the time at which the video image is captured on the vehicle 10 side to the video image data.

Step 23 (S23): The server 20 analyzes the received video image. Various methods can be used to analyze the video image, and images of a person and a building can be analyzed by so-called pattern recognition. Means such as machine learning may also be used.

Step 24 (S24): As a result of the video image analysis, in the case where the video image of the person is recognized in the disaster-affected area, such a person is regarded as a rescue target and is handled. If the rescue target is discovered, the processing proceeds to step 25. If the rescue target is not discovered, the processing proceeds to step 26.

Step 25 (S25): As the result of the video image analysis, in the case where the person (the rescue target) is discovered, the server 20 first displays the video image on the server display section 24. Then, the person (the rescue target) is visually checked, and his/her situation is grasped. Furthermore, the server 20 sends the video image to a rescue department (police, a fire department, or the like). In this way, the person (the rescue target) can promptly be rescued.

Step 26 (S26): The server 20 determines a degree of the damage caused by the disaster on the basis of the result of the video image analysis. For example, in the case of earthquake/typhoon damage, the pattern recognition of subsidence, an inclination, a damage situation of a building structure, and the like is made on the basis of the video image of the building. Then, the degree of the damage caused by the disaster can be categorized into minimal, minor, moderate, major, and the like. In addition, in the case of a flood or the like, a water depth is calculated on the basis of the video image, so as to determine a level of the damage caused by the disaster.

Step 27 (S27): The server 20 reads the map information from the server storage section 22, and associates the video image with the map information on the basis of the vehicle location information sent from each of the vehicles 10. In addition, the hazard map can be created by overlapping the degree of the damage caused by the disaster (the degree of the damage caused by the disaster that is determined on the basis of the video image) with the map information on the basis of the location information from each of the vehicles 10. The captured video image (the captured image) of each of the vehicles 10 may be attached to the hazard map.

Step 28 (S28): The server 20 can display the created hazard map or the received video image by using the server display section 24 when necessary.

As described above, according to the disclosure, the video image is acquired from the unattended vehicle in the disaster-affected area. Thus, it is possible to grasp the disaster-affected situation in real time even when the person does not enter the disaster-affected area.

In the above embodiment, the description has been made on the configuration and the operation of the controller 11 for the vehicle. However, the present disclosure is not limited thereto, and may be configured as a control method for the vehicle in which the capturing section mounted on the vehicle is activated when the presence or the absence of the damage caused by the disaster is determined and it is determined that the vehicle is affected by the disaster.

A computer can preferably be used to function as the above-described controller 11 for the vehicle. Such a computer can be realized by storing a program, in which processing contents to realize each of the functions of the controller 11 is written, in a storage section of the computer and by loading and executing this program by a CPU of the computer. This program can be recorded in a computer-readable recording medium.

The above-described embodiment has been described as a representative example, and it is obvious for the person skilled in the art that various modifications and replacement can be made to the disclosure within the gist and the scope of the disclosure. Thus, it should not be understood that the disclosure is limited to the above-described embodiment, and various modifications and changes can be made thereto without departing from the claims. For example, the plural configuration blocks described in the embodiment can be combined into one, or the single configuration block can be divided.

What is claimed is:

1. An information processing system comprising:
plural vehicles; and
a server, wherein
   each of the plural vehicles includes a processor configured to:
      determine a presence or an absence of damage caused by a disaster when a respective vehicle is in an ACC-off state and when the respective vehicle is in an IG-off state, the ACC-off state being an accessory-off state and the IG-off state being an ignition-off state, the presence or the absence of the damage being determined using a sensor section that is always connected to a power supply section of the respective vehicle that supplies power or the presence or the absence of the damage being determined using a communicating section that is always connected to the power supply section of the respective vehicle such that the power is always supplied to the sensor section or the communication section when the respective vehicle is in the ACC-off state and when the vehicle is in the IG-off state,
      switch a power state to a state that supplies the power from the power supply section to a capturing section mounted on the vehicle at a time of the disaster, and
      send a video image, captured by the capturing section, and location information to the server, and
   the server is configured to
      accumulate video images sent from the plural vehicles, and
      associate the video images with map information.

2. The information processing system according to claim 1, wherein the server is configured to analyze a degree of damage caused by the disaster on a basis of the video images.

3. The information processing system according to claim 1, wherein the processor of each of the plural vehicles is configured to be always connected to the power supply section of the respective vehicle.

4. The information processing system according to claim 1, wherein the processor of each of the plural vehicles is configured to activate a light when the processor determines that it is dark.

5. The information processing system according to claim 1, wherein the processor of each of the plural vehicles is configured to perform an operation to close a window when the window is open at a time when it is determined that there is the presence of the damage caused by the disaster.

6. An information processing system comprising:
plural vehicles; and
a server, wherein
   each of the plural vehicles includes a processor configured to:
      determine a presence or an absence of damage caused by a disaster when a respective vehicle is in an ACC-off state and when the respective vehicle is in an IG-off state, the ACC-off state being an accessory-off state and the IG-off state being an ignition-off state, the presence or the absence of the damage being determined using a sensor section that is always connected to a power supply section of the respective vehicle that supplies power or the presence or the absence of the damage being determined using a communicating section that is always connected to the power supply section of the respective vehicle such that the power is always supplied to the sensor section or the communication section when the respective vehicle is in the ACC-off state and when the vehicle is in the IG-off state,
      switch a power state to a state that supplies the power from the power section to a capturing section mounted on the vehicle at a time of the disaster,
      send a video image, captured by the capturing section, and location information to the server, and
      stop capturing and sending the video image and send a vehicle log package at a time point when a charged amount of the power supply section of the respective vehicle is reduced to a specified amount, and
   the server is configured to
      accumulate video images sent from the plural vehicles,
      associate the video images with map information, and
      analyze a degree of damage caused by the disaster on a basis of the video images.

7. The information processing system according to claim 1, wherein the processor of each of the plural vehicles is configured to make the determination on a basis of a detection of the damage caused by the disaster from the sensor section or a reception of emergency disaster information from the communicating section.

8. The information processing system according to claim 1, wherein the processor of each of the plural vehicles is configured to activate a windshield wiper when the processor determines that it is difficult to see outside from inside of the respective vehicle.

9. The information processing system according to claim 1, wherein the processor of each of the plural vehicles is configured to stop capturing and sending the video image and send a vehicle log package at a time point when a charged amount of the power supply section of the respective vehicle is reduced to a specified amount.

10. The information processing system according to claim 8, wherein the processor of each of the plural vehicles is configured to send a video image, which is captured by the capturing section, and information indicating that the windshield wiper does not move to a server when the windshield wiper does not move even when being activated.

* * * * *